April 27, 1965 E. C. KLAAS 3,181,075

SIGNAL REPRODUCING SYSTEM

Filed Aug. 27, 1962 2 Sheets-Sheet 1

INVENTOR

Edward C. Klaas,

BY

ATTORNEY

INVENTOR

Edward C. Klaas,

BY

[signature]

ATTORNEY

United States Patent Office 3,181,075
Patented Apr. 27, 1965

3,181,075

SIGNAL REPRODUCING SYSTEM

Edward Charles Klaas, Salt Point, N.Y.
(Martin Road, Pleasant Valley, N.Y.)

Filed Aug. 27, 1962, Ser. No. 219,803
3 Claims. (Cl. 328—167)
(Granted under Title 35, U.S. Code (1952), sec. 266)

Figure 1:
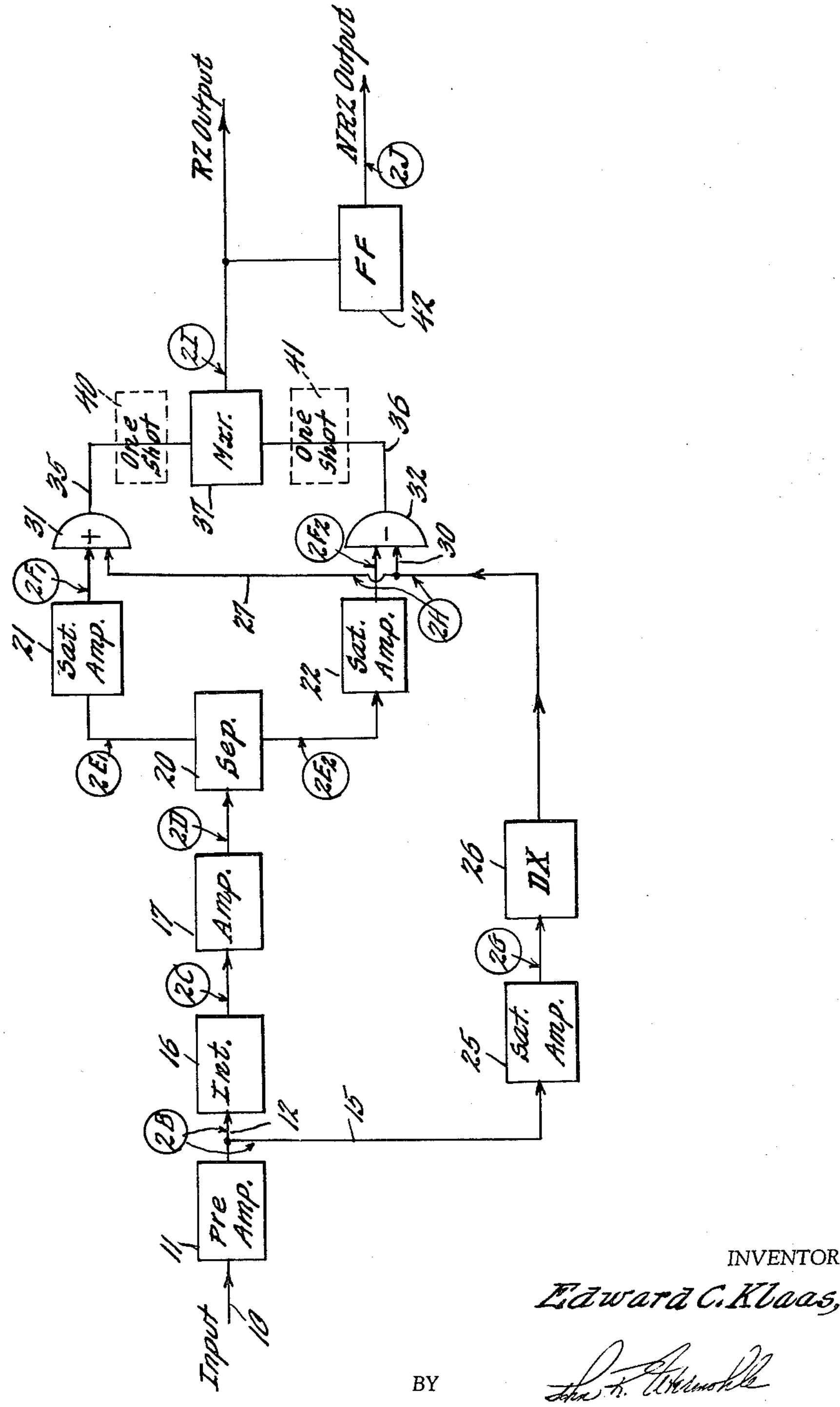

The invention described herein may be manufactured and used by or for the Government for governmental purposes without the payment to me of any royalty thereon.

This invention relates to a signal reproducing system and more particularly to a signal reproducing system for removing all noise components from a signal being applied thereto.

Probably the most straightforward method of recording digital information on a magnetic surface is to apply a pulse of current in one direction through a magnetic head for a 0 (zero) and a pulse in the opposite direction for 1 (one). This method is called the "return-to-zero" or RZ method because the current returns to zero between bits of information. In the RZ method, the distance allotted to the storage of one bit of information is called a "cell." When the individual writing current pulses are spread out in time (or distance) so that they occupy a full bit cell, the recording method is called "nonreturn-to-zero" or NRZ. The reason for the latter name is that the pulses lose their individuality, and the writing current does not return to zero between successive 0's or successive 1's. Instead, the storage surface is continually magnetized in saturation to one direction or the other, with the direction of magnetization being reversed when a 1 follows a 0 or when a 0 follows a 1. In a modified NRZ method of recording, the direction of current flow is alternated each time a 1 is to be recorded, but the current is allowed to flow in its original direction for a 0.

Of all the above-described methods of containing digital information in a pulse train, the RZ method possesses, by its logic, a unique advantage in that clock information can be included therein. When a pulse train of digital information which includes clock pulses is to be reproduced, time-base distortion, introduced into the reproduced waveform (by, for example, variations in the speed of magnetic tape) will appear also in the clock frequency and avoid any necessity to generate a clock externally that will adequately cope with this instability.

An object of the present invention is to provide a new and improved signal reproducing system.

Another object of the present invention is to provide a new and improved signal reproducing system for removing all noise components from a signal being applied thereto.

A still further object of the present invention is to provide a new and improved signal reproducing system wherein waveforms such as those based on the RZ method are reproduced reliably so that all distortion is removed therefrom.

A signal reproducing system, embodying certain features of the invention, may include means for generating a signal having high and low frequency noise components associated therewith, a high frequency filter, means for applying the originally generated signal to the high frequency filter and for deriving an output therefrom, a low frequency filter, means for applying the originally generated signal to the low frequency filter and for deriving an output therefrom, a mixing circuit and means for applying the outputs from both filters to the mixing circuit for reconstructing the originally generated signal without the noise components.

Figure 2:
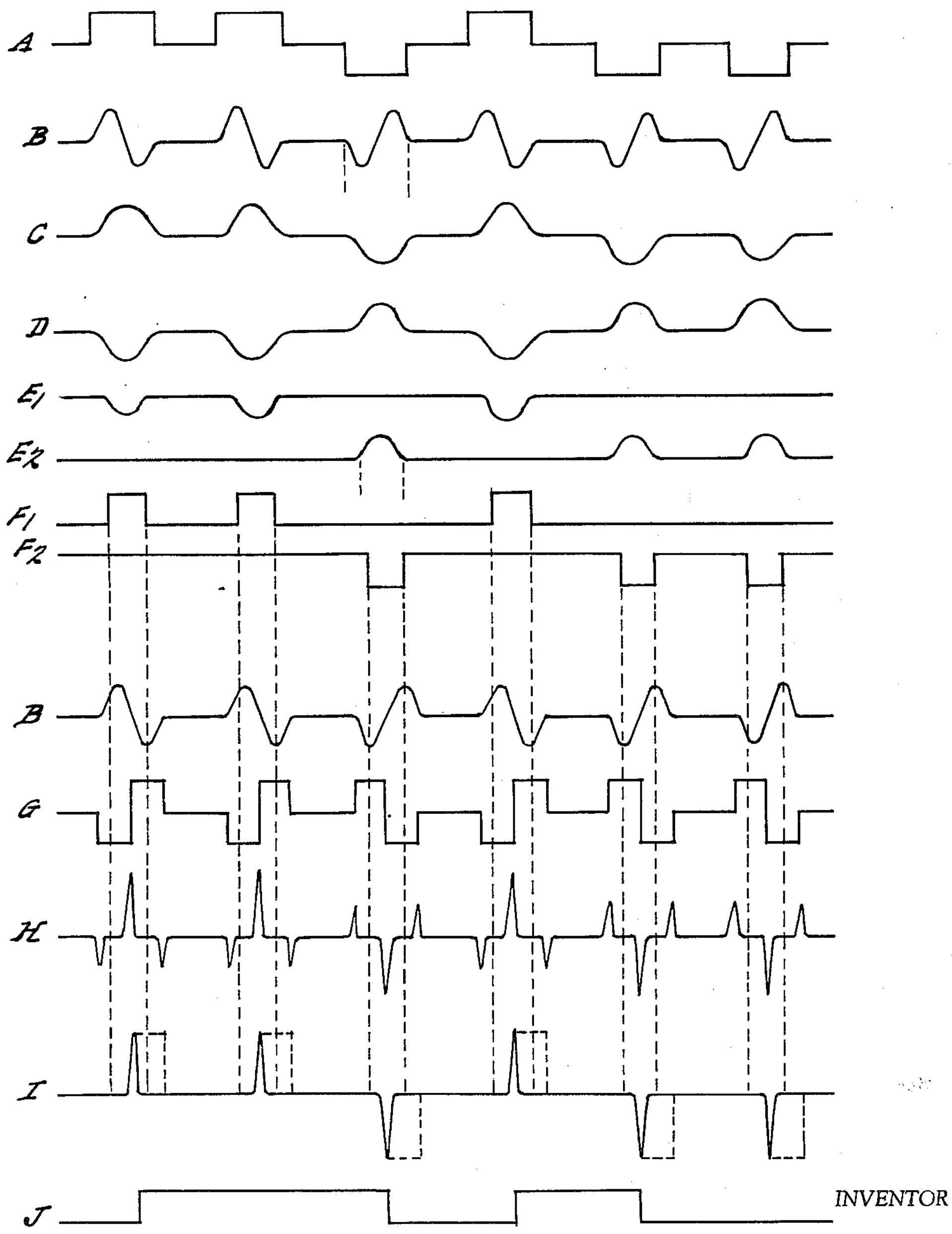

The above-recited and other objects and features of the invention will be apparent from the following detailed description of a specific embodiment thereof, when read in conjunction with the accompanying drawings, in which:

FIG. 1 shows a block diagram of a signal reproducing system embodying the invention, and FIG. 2 shows a plurality of potentials which appear at particular points in the circuit shown in FIG. 1.

Referring now to FIG. 1, the system which embodies the present invention is shown therein. For illustrative purposes, a signal which is based on the RZ method of reproduction will be described. Such a signal may be derived from, or otherwise generated by, a magnetic reproducing head (not shown), reading a magnetically recorded RZ flux pattern. The RZ flux pattern may be similar to, or a somewhat distorted version of, the RZ signal shown in FIG. 2A. An output from the reproducing head is applied to an input lead 10 and amplified in a preamplifier 11. The waveform shown in FIG. 2B represents the output of the preamplifier 11 and is an amplified version of the waveform being applied to the input thereof. It will be assumed that this signal includes digital information and clock pulses, and, because the signal is generated by a magnetic reproducing head, the signal will have at least two characteristics and problem areas. More specifically, it will be subject to amplitude variations due to varying conditions on the magnetic tape and the tape-to-head contact. Such variations are inherent in the magnetic reproduction process and will result in variations in amplitude from full signal to no signal at all. Also, the reproduced waveform will contain noise. Again, this problem is inherent in any system, and such noise must not be allowed to appear in the final RZ output or affect the reproduction process. The system shown in FIG. 1 minimizes or totally eliminates both of the above problems.

As stated previously, the output of the reproducing head is applied to the input lead 10 and is amplified in the preamplifier 11, and a typical output from such a preamplifier is shown in FIG. 2B. The output of the preamplifier 11 is applied to leads 12 and 15. The amplified signal on the lead 12 is applied to an integrator 16 which may be any type well known in the art such as a series resistor and parallel capacitor. Such an integrator is basically a low pass filter so that high frequencies, including high frequency noise, appearing in the signal are reduced or eliminated therefrom. The integrated signal appearing at the output of the integrator is shown in FIG. 2C, and it will be noted that the signal closely resembles, from the standpoint of amplitude, the orginally recorded signal shown in FIG. 2A. From this, it can be seen that the integration process produces two positive effects, namely, the double-transition pulse is transformed into a single-polarity pulse, and high frequency noise present in the signal on the tape is reduced. Then, since the waveform of FIG. 2C from the integrator is at a low potential and is nonsymmetrical, it is amplified in a D.C. amplifier 17 to produce the waveform shown in FIG. 2D. In any point of this process, the nonsymmetrical wave must be handled without a coupling capacitor to avoid any problem of D.C. axis shift due to the nonsymmetry.

The waveform shown at FIG. 2D is then separated by a separator 20 into two separate pulse trains shown in FIGS. $2E_1$ and $2E_2$. Such a separation must take place since there is no other way to distinguish between positive- and negative-going transitions at the zero points of the waveform shown in FIG. 2B, that is, at the mid points of the pulses in the signal of FIG. 2A. While no specific structure is shown for the separator 20, it may comprise series steering diodes (not shown) which, depending upon the type used, will remove a portion of each pulse train near the voltage axis by utilizing the forward conductive characteristics of the diodes. This is suggested since this action will help to reduce noise further and to reduce the pulse width (i.e., the widths of the pulses in FIGS. $2E_1$ and $2E_2$ are less than those of FIG. 2B). The pulses shown in FIGS. $2E_1$ and $2E_2$ are then applied to and allowed to saturate high gain amplifiers 21 and 22, respectively. Therefore, the saturated amplifiers 21 and 22 square the waveforms of FIGS. $2E_1$ and $2E_2$ to result in the waveforms shown in FIGS. $2F_1$ and $2F_2$, respectively, These latter waveforms will be used as gating potentials as will be described herein below.

The output from the preamplifier 11 which was applied to the lead 15 is also applied to a high gain amplifier 25. Therein, the waveform shown in FIG. 2B (which is repeated below FIG. $2F_2$) is allowed to saturate the amplifier 25 symmetrically to produce, at the output thereof, the waveform shown in FIG. 2G. This waveform is then applied to a differentiator 26 which may be of any type well known in the art such as a series capacitor and a parallel resistor. The differentiator 26 is effectively a high pass filter, and low frequency noise is reduced or removed thereby from the originally generated signal to produce a waveform such as that shown in FIG. 2H. It will be seen in this waveform that each of the first two differentiated pulses includes a relatively large, positive pulse which is substantially centrally located between two small, negative pulses. The opposite is true of the third pulse which is opposite to the first two. In either event, it will be noted that the smaller pulses occur before and after the occurrence of the gating pulses shown in FIGS. $2F_1$ and $2F_2$ so that the smaller pulses will be removed from the system in the manner that will now be described.

The complete waveform shown in FIG. 2H is applied over leads 27 and 30 to a positive AND gate 31 and to a negative AND gate 32, respectively. As is well known in the art, the application of two positive pulses to the positive AND gate 31 will result in an output therefrom on an output lead 35. It will be noted that the positive pulses shown in FIG. $2F_1$ are being applied to the AND gate 31 when the positive portions of the waveform in FIG. 2H are applied thereto. Consequently, when the large, positive pulses of FIG. 2H occur, outputs are applied to the lead 35. Similarly, it will be noted that the negative pulses of FIG. $2F_2$ are applied to the negative AND gate 32 when the large, negative pulses of FIG. 2H are applied thereto. Consequently, when these two negative pulses coexist, an output, a negative pulse, is applied to a lead 36 which is the output from the negative AND gate 32.

The outputs from the AND gates 31 and 32 are then linearally mixed in any suitable mixer 37 to result in the waveform (that depicted by a solid line) shown in FIG. 2I. The mixer 37 may include any well-known adding technique that will form a serial output from parallel channels to result in the waveform shown in FIG. 2I. At any rate, the solid line waveform of this figure may serve as the RZ output. If a finite pulse length is desired, a one-shot multivibrator may be placed between the output of each of the AND gates and the mixer to shape the desired pulse. Such one-shot multivibrators are shown in dashed lines at 40 and 41 in FIG. 1, and their effect on the circuit is shown in dashed lines on the waveform of FIG. 2I. Either may be used for the RZ output.

With the above-described structure, an RZ output pulse (FIG. 2I) will occur if a gate pulse (FIGS. $2F_1$ and $2F_2$) and a signal pulse (FIG. 2H) occur simultaneously at the input to the gates. Since the signal taken from the magnetic tape and applied to the input lead 10 is first integrated by the integrator 16 to eliminate high frequency noise, and since the signal is also sent through the differentiator 26 to eliminate low frequency noise, when these signals are "reunited" in the mixer 32, the chance of actual transitions in the signals being caused by noise therein is minimized to such an extent that it is virtually eliminated. More specifically, since the output pulses from the mixer 37 are derived from the simultaneous occurrence of gating pulses (FIGS. $2F_1$ and $2F_2$) and the signal pulses (FIG. 2H), the chance of high frequency noise occurring in the one while low frequency noise occurs in the other at the same time is negligible.

With the system described above, the input waveform being applied thereto has been greatly amplified while the noise is reduced to such an extent that it is, for all practical purposes, eliminated. Amplitude variations appearing in the waveform of FIG. 2B will not appear in the waveforms of FIGS. 2E, 2F or 2H. Therefore, the system of the present invention is greatly advantageous in view of its reliability. The signal searching time occurs only during the time duration of the pulses shown in FIG. 2B and not between such pulses. Thus, noise, either from the tape or introduced somewhere in the system, which might be present between signal pulses does not receive a gating pulse and is removed. The integration of the waveform of FIG. 2B by the integrator 16 to produce the single polarity pulse of FIG. 2C again reduces noise and increases the signal-to-noise ratio. Finally, the suggested use of steering diodes in the separator 20 again reduces noise.

Many modifications may be made to the present invention without departing from the spirit and scope thereof. For example, in order to obtain an NRZ output from the system shown in FIG. 1, a bistable flip-flop 42 may be connected to the output of the mixer 37 to be energized by the usual RZ output. In this case, the output of the flip-flop 42 driven in such a manner maintains the polarity of the NRZ waveform even in the case of a drop out error.

What is claimed is:

1. A system for reproducing a series of positive and negative signal pulses which have high and low frequency noise components associated therewith, which comprises a low pass filter, means for applying the signal pulses to the low pass filter to provide a series of positive and negative pulses in which the high frequency noise has been reduced, means for separating the positive and negative pulses provided by the low pass filter to provide a series of positive pulses and a series of negative pulses, a positive AND gate and a negative AND gate, means for applying the series of positive pulses provided by the separating means to the positive AND gate and the series of negative pulses provided thereby to the negative AND gate, a high pass filter, means for applying the signal pulses to the high pass filter to provide a series of positive and negative pulses in which the low frequency noise has been reduced, means for applying the series of positive and negative pulses provided by the high pass filter to the positive and negative AND gates, and means energized by outputs of the AND gates for reconstructing the signal pulses without the associated noise components.

2. A system for reproducing input pulses which include positive and negative signal pulses with high and low frequency noise components associated therewith, which comprises an integrator circuit, means for applying the input pulses to the integrator circuit for providing positive and negative signal pulses in which the high frequency noise has been reduced, a differentiator circuit, means for applying the input pulses to the differentiator for providing positive and negative signal pulses in which the low frequency noise has been reduced, a positive AND gate for providing a positive pulse output upon the conjoint application of two positive pulse inputs thereto, a negative AND gate for providing a negative pulse output upon the conjoint application of two negative pulse inputs thereto, means for applying the positive integrated and differentiated signal pulses to the positive AND gate, means for applying the negative integrated and differentiated signal pulses to the negative AND gate, a mixer circuit, and means for applying the outputs of the AND gates to the mixer circuit to provide therefrom positive and negative signal pulses representative of the input pulses without the noise components.

3. A signal reproducing system which comprises means for generating a signal having high and low frequency noise components associated therewith, an integrating circuit, means for applying the generated signal to the integrating circuit for reducing the high frequency noise components therein, a separator, means for applying the integrated signal to the separator for separating the positive and negative portions of the integrated signal, a positive AND gate and a negative AND gate, means for applying the positive portions of the integrated signal to the positive AND gate and the negative portions of the integrated signal to the negative AND gate, a differentiating circuit, means for applying the generated signal to the differentiating circuit for reducing the low frequency noise components therein, means for applying the differentiated signal to the positive and negative AND gates, the conjoint application of positive integrated and differentiated pulses to the positive AND gate resulting in positive pulse outputs therefrom and the conjoint application of negative integrated and differentiated pulses to the negative AND gate resulting in negative pulse outputs therefrom, and means for mixing the outputs of the positive and negative AND gates and thereby providing a signal which is effectively similar to the originally generated signal without the noise components therein.

References Cited by the Examiner

UNITED STATES PATENTS

| | | | |
|---|---|---|---|
| 1,315,539 | 9/19 | Carson | 328—164 |
| 2,606,972 | 8/52 | Scott | 328—167 |

FOREIGN PATENTS

| | | |
|---|---|---|
| 575,244 | 5/59 | Canada. |

JOHN W. HUCKERT, *Primary Examiner.*

ARTHUR GAUSS, *Examiner.*